US012661986B2

(12) United States Patent
Lee

(10) Patent No.: US 12,661,986 B2
(45) Date of Patent: Jun. 23, 2026

(54) PLASTIC COVER LENS AND DISPLAY FOR VEHICLE INCLUDING THE SAME

(71) Applicant: HYUNDAI MOBIS CO., LTD., Seoul (KR)

(72) Inventor: Joung Hoon Lee, Yongin-Si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 410 days.

(21) Appl. No.: 18/192,782

(22) Filed: Mar. 30, 2023

(65) Prior Publication Data

US 2024/0149683 A1 May 9, 2024

(30) Foreign Application Priority Data

Nov. 4, 2022 (KR) ......................... 10-2022-0146255

(51) Int. Cl.
B60K 35/50 (2024.01)
B60K 35/40 (2024.01)

(52) U.S. Cl.
CPC ............ B60K 35/50 (2024.01); B60K 35/425 (2024.01); B60K 2360/693 (2024.01)

(58) Field of Classification Search
None
See application file for complete search history.

(56) References Cited

U.S. PATENT DOCUMENTS

| | | | |
|---|---|---|---|
| 9,465,472 B1 | 10/2016 | Almanza-Workman et al. | |
| 2019/0331959 A1* | 10/2019 | Weindorf | .......... G02F 1/133526 |
| 2021/0109396 A1* | 4/2021 | Lee | ........................ G02B 1/18 |

FOREIGN PATENT DOCUMENTS

| | | |
|---|---|---|
| FR | 3097478 A1 | 12/2020 |
| KR | 2020-0052319 A | 5/2020 |
| KR | 2021-0043685 A | 4/2021 |
| KR | 2021-0044420 A | 4/2021 |

OTHER PUBLICATIONS

European Search Report issued Oct. 25, 2023 in corresponding European Patent Application No. 23170394.3.
Office Action issued Mar. 29, 2024 in corresponding Korean Patent Application No. 10-2022-0146255.

* cited by examiner

*Primary Examiner* — Shan Liu
(74) *Attorney, Agent, or Firm* — NovoTechIP International PLLC

(57) ABSTRACT

Disclosed is a display for a vehicle including a plastic cover lens including a lens, a front film disposed on a front surface of the lens, and a rear film disposed on a rear surface of the lens, a super retardation film (SRF) adhered to a rear surface of the plastic cover lens using an optically clear adhesive (OCA), a liquid crystal display module adhered to a rear surface of the super retardation film using the optically clear adhesive, a panel-front assembled at the rear of the plastic cover lens, in close contact with and supporting the liquid crystal display module, and preventing deformation of the plastic cover lens, and a rear cover assembled at the rear of the panel-front.

10 Claims, 3 Drawing Sheets

PLASTIC COVER LENS AND DISPLAY FOR VEHICLE INCLUDING THE SAME

CROSS-REFERENCE TO RELATED APPLICATIONS

Pursuant to 35 U.S.C. § 119(a), this application claims the benefit of Korean Patent Application No. 10-2022-0146255, filed on Nov. 4, 2022, which is hereby incorporated by reference as if fully set forth herein.

TECHNICAL FIELD

The present disclosure relates to a display for a vehicle including a plastic cover lens disposed in a cluster and a center fascia of the vehicle.

BACKGROUND

Contents described in this section simply provide background information for the present embodiment and do not constitute prior art.

A cluster provides various types of information related to a travel state of a vehicle to a driver as visual information. A speed of the vehicle, an engine RPM, a fuel amount, a thermometer, and various warnings are displayed. In addition, a display installed in a center fascia provides various additional convenient information including a navigation to the driver. As the vehicle becomes smarter, an amount of information provided by the cluster increases.

On the other hand, light is introduced into the cluster of the traveling vehicle from various angles and the light is reflected toward a line of sight of the driver, making it difficult to grasp instrument panel information. In general, a shielding wall surrounding the cluster and protruding in a direction of the driver significantly reduces an amount of light entering the instrument panel. However, compared to a conventional analog-type cluster, the display for the vehicle is more likely to reflect stray light that hinders driver's identification of the instrument panel because a liquid crystal display module thereof is disposed over a large area.

Most of popular displays for the vehicle are still in a flat shape, but starting with high-end vehicles, large glass lenses that reduce the effect of the reflected light and improve visibility because of a three-dimensional curved front lens are being applied. The glass lens is easy to secure an optical performance in harsh vehicle environments such as temperature, humidity, and vibration, but a high manufacturing cost for three-dimensional molding is pointed out as an obstacle to popularization.

SUMMARY

In order to solve the above problems, one embodiment of the present disclosure is to provide a display for a vehicle that reduces manufacturing costs, provides sufficient durability and optical performance required for the display for the vehicle, and is advantageous for enlargement by applying a plastic cover lens instead of a glass lens as a lens of the display for the vehicle having a three-dimensional shape.

The problems to be solved in the present disclosure are not limited to the technical problems mentioned above, and other technical problems not mentioned will be clearly understood by those skilled in the art to which the present disclosure belongs from the description below.

A display for a vehicle according to one of the embodiments of the present disclosure to solve the above-described problem includes a plastic cover lens including a lens, a front film disposed on a front surface of the lens, and a rear film disposed on a rear surface of the lens, a super retardation film (SRF) adhered to a rear surface of the plastic cover lens using an optically clear adhesive (OCA), a liquid crystal display module adhered to a rear surface of the super retardation film using the optically clear adhesive, a panel-front assembled at the rear of the plastic cover lens, in close contact with and supporting the liquid crystal display module, and preventing deformation of the plastic cover lens, and a rear cover assembled at the rear of the panel-front.

In one implementation, the front film includes an anti-reflection (AR) coating layer and an anti-fingerprint (AF) coating layer formed at a front surface of the plastic cover lens via vacuum deposition.

In one implementation, the rear film includes a black masking layer printed on the rear surface of the lens excluding a window area corresponding to a position of the liquid crystal display module.

In one implementation, the plastic cover lens includes the front film and the rear film pre-molded in a shape of the plastic cover lens and is formed via insert mold labeling (IML).

In one implementation, the plastic cover lens is formed such that a residual stress resulted from injection is minimized as the front film is disposed in an upper core of a mold and the rear film is disposed in a lower core of the mold and are pressurized to simultaneously perform injection-compression molding (ICM) during in-mold molding.

In one implementation, the plastic cover lens includes a first area disposed on a side of a driver, a second area disposed on an opposite side of the first area, and a bent portion disposed between the first area and the second area.

In one implementation, a first radius of curvature of the plastic cover lens is applied such that a radius of curvature of the bent portion is greater than a radius of curvature of the first area and a radius of curvature of the second area is greater than the radius of curvature of the bent portion.

In one implementation, the plastic cover lens is formed in a shape having a 3D curvature as the first radius of curvature is applied to the plastic cover lens in a horizontal direction, a second radius of curvature is applied to the plastic cover lens in a vertical direction for the plastic cover lens to become a concave lens, and a third radius of curvature is applied to a corner of the plastic cover lens.

In one implementation, the corner of the plastic cover lens is formed to be rounded with a radius in a range from 2 mm to 3 mm.

In one implementation, the display further includes a carrier-bezel mechanically coupled to an edge of the plastic cover lens to firmly maintain a shape of the plastic cover lens.

In one implementation, the display further includes an adhesive tape adhered to at least a portion of the rear surface of the plastic cover lens to couple the plastic cover lens and the carrier-bezel to each other.

According to one of the embodiments of the present disclosure, the three-dimensional shape may be easily implemented by applying the plastic cover lens as the lens for the display for the vehicle.

According to one of the embodiments of the present disclosure, the manufacturing costs may be significantly reduced by reducing the gate wash-out caused by the insert mold labeling (IML) scheme via the placement of the black masking layer on the rear surface of the plastic cover lens of the display for the vehicle.

The effects obtainable from the present disclosure are not limited to the effects mentioned above, and other effects not mentioned will be clearly understood by those skilled in the art from the description below.

DETAILED DESCRIPTION

Figure 1:
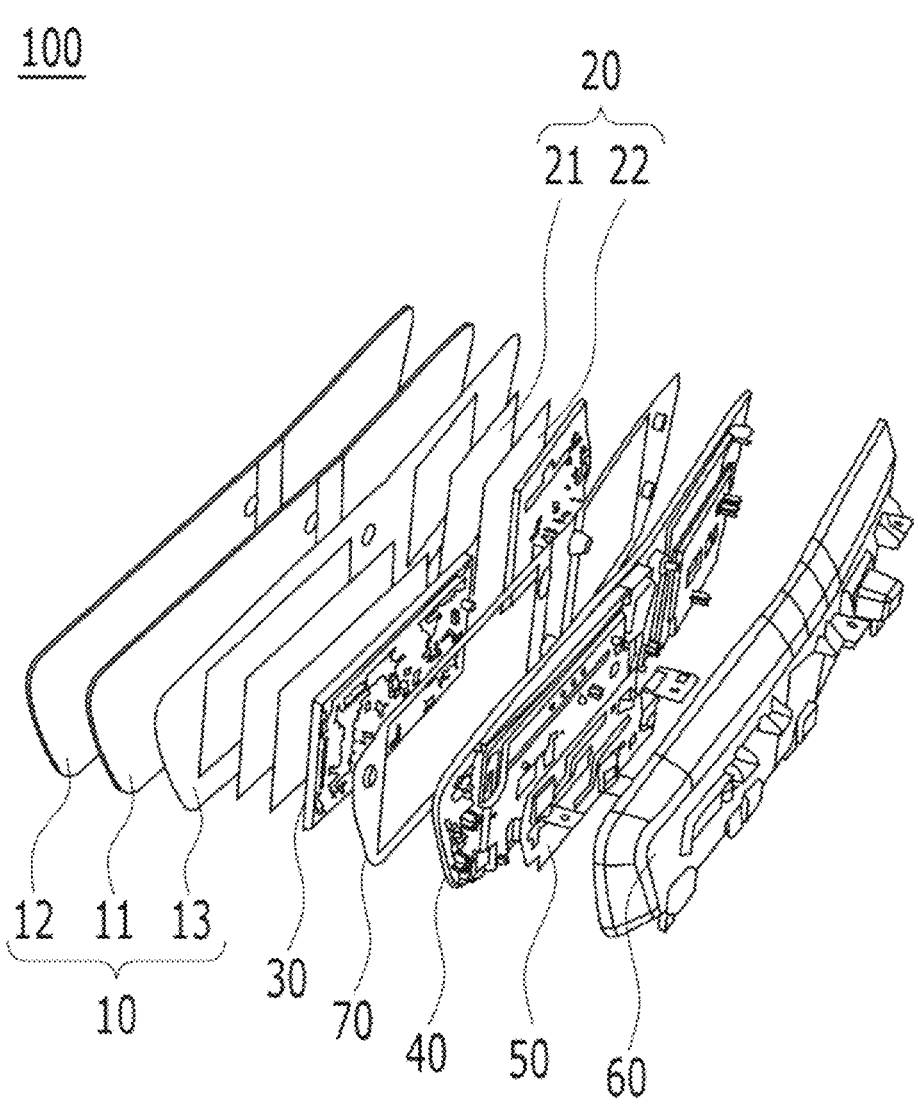
FIG. 1 is an exploded perspective view of a display for a vehicle including a plastic cover lens according to one embodiment of the present disclosure.

Hereinafter, with reference to the accompanying drawings, the embodiment of the present disclosure will be described in detail such that a person having ordinary knowledge in the technical field to which the present disclosure belongs may easily practice the same. However, the present disclosure is able to be implemented in many different forms and is not limited to the embodiment described herein. In addition, in order to clearly illustrate the present disclosure in the drawings, components irrelevant to the description are omitted and similar reference numerals are assigned to similar components throughout the present document.

Throughout the present document, when a component is referred to as "including" another component, it implies a presence of the latter component, along with a possibility of additional components, unless otherwise stated.

FIG. 1 is an exploded perspective view of a display for a vehicle including a plastic cover lens according to one embodiment of the present disclosure.

Referring to FIG. 1, a display 100 for a vehicle including a plastic cover lens according to one embodiment may include a plastic cover lens 10, an optical bonding layer 20, a liquid crystal display module 30, a panel-front 40, brackets 51 and 52, and a rear cover 60.

As the display 100 for the vehicle, a console display that displays various convenient information such as a navigation is disposed in a cluster and a center fascia that display a basic state of the vehicle. A case in which the display 100 for the vehicle includes the plastic cover lens 10 and is disposed across the cluster and the center fascia in front of a driver will be exemplified. The plastic cover lens 10 having a plurality of curvatures is disposed on an outermost surface of the display 100 for the vehicle toward the driver, that is, at a front portion of the display 100 for the vehicle.

The plastic cover lens 10 may include a lens 11, a front film 12 disposed on a front surface of the lens, which is the outermost surface toward the driver, and a rear film 13 disposed on a rear surface of the lens.

The lens 11 may be manufactured by high fluidity PC clear injection molding. The front film 12 including anti-reflection (AR) and anti-fingerprint (AF) coating layers may be disposed on the front surface of the lens 110 by vacuum deposition. The front film 12 may be formed to realize hardness and transparency of the plastic cover lens 10.

The rear film 13 may be disposed on the rear surface of the lens 11, and the rear film may include a black masking layer. In this regard, the black masking layer may be printed except for a window area corresponding to a position of the liquid crystal display (LCD) module.

The plastic cover lens 10 exhibits an excellent optical property by molding the front film and a second film in a predetermined shape, inserting a first film into an upper core of a mold and inserting the rear film into a lower core of the mold, and performing compression molding during injection. The plastic cover lens 10 has an effect of reducing reflection of stray light by applying compression injection to minimize birefringence.

For example, the plastic cover lens 10 may be formed in an insert mold labeling (IML) scheme. In this scheme, the front film and the rear film 12 and 13 are molded into a shape of the lens 11 beforehand, then inserted into the mold, and then finally molded with plastic inserted from the rear. In such manner, a hard coated film material may be used, so that a considerable level of abrasion resistance may be secured. In addition, because the different films may be manufactured using the same plastic cover lens mold, a variety of products may be manufactured in small quantities.

For example, the plastic cover lens 10 may be formed in an injection-compression molding (ICM) scheme. The injection-compression molding may be performed along with the insert mold labeling. Therefore, after the molding of the plastic cover lens 10, a density of the plastic cover lens 10 may be maintained more uniformly throughout a body and a residual stress of the injection-molded product resulted from a difference in a cooling speed depending on a shape of the lens and a structure of the mold may be minimized.

Because the black masking layer of the plastic cover lens 10 is located on the rear film 12, a gate wash-out problem caused by the insert mold labeling scheme may be prevented from occurring.

The optical bonding layer 20 may include an optically clear adhesive (OCA) 21 and a super retardation film (SRF) 22.

The optically clear adhesive 21 may be disposed on a rear surface of the plastic cover lens 10 to be optically in contact with a liquid crystal display (LCD). The super retardation film 22 may be disposed between the optically clear adhesive 21 and the liquid crystal display (LCD).

On a front surface of the liquid crystal display, polarization may be applied and utilized in a complex manner to enhance a clarity, a viewing angle, and the like. When the driver wears sunglasses with a polarization function and looks at the liquid crystal display, a rainbow-shaped distortion may occur in an image displayed on the liquid crystal display because of the complex polarization states. Internal stress in the plastic cover lens 10 causes a phase shift in transmitted light, resulting in increased birefringence and making such distortion more pronounced. In the present embodiment, to reduce such phenomenon, the super retardation film 22 may be bonded to the rear surface of the plastic cover lens 10 via direct bonding using the optically clear adhesive (OCA) 21. In such manner, the plastic cover lens 10 and the super retardation film 22 may act as one optical element.

Therefore, the liquid crystal display 10 may be bonded a rear surface of the super retardation film 22 using the optically clear adhesive (OCA) such that the liquid crystal display to the plastic cover lens 10 act as one optical element and reflection at a bonding surface is minimized. The optically clear adhesive 21 may be disposed on the rear surface of the super retardation film 22 or on a front surface of the liquid crystal display and the liquid crystal display may be attached to the rear surface of the super retardation film 22 to bond the liquid crystal display to the super retardation film 22.

The liquid crystal display module 30 may include the liquid crystal display (LCD) and a back light unit (BLU).

Because a front surface of the plastic cover lens 10 and the injection-molded product are transparent, an assembly cannot be placed on the rear surface of the plastic cover lens 10, so that the panel-front 40 and the rear surface of the plastic cover lens 10 may be bonded together using an adhesive 70.

The panel-front 40 is formed to have high structural rigidity and is coupled to the plastic cover lens 10 to maintain a design shape of the plastic cover lens 10. A remaining area of the rear surface of the panel-front 40 except for a pocket area formed to accommodate the liquid crystal display therein may be formed such that the panel-front 40 may have sufficiently high rigidity against bending while seeking weight reduction.

The bracket 50 may be disposed on a rear surface of the panel-front to strengthen structural integrity and reinforce rigidity against head-impact. For example, the bracket 50 may be made of a steel material.

The rear cover 60 may be formed to expose rear surfaces of upper ends of an installed structure and the display 100 for the vehicle.

Figure 2:
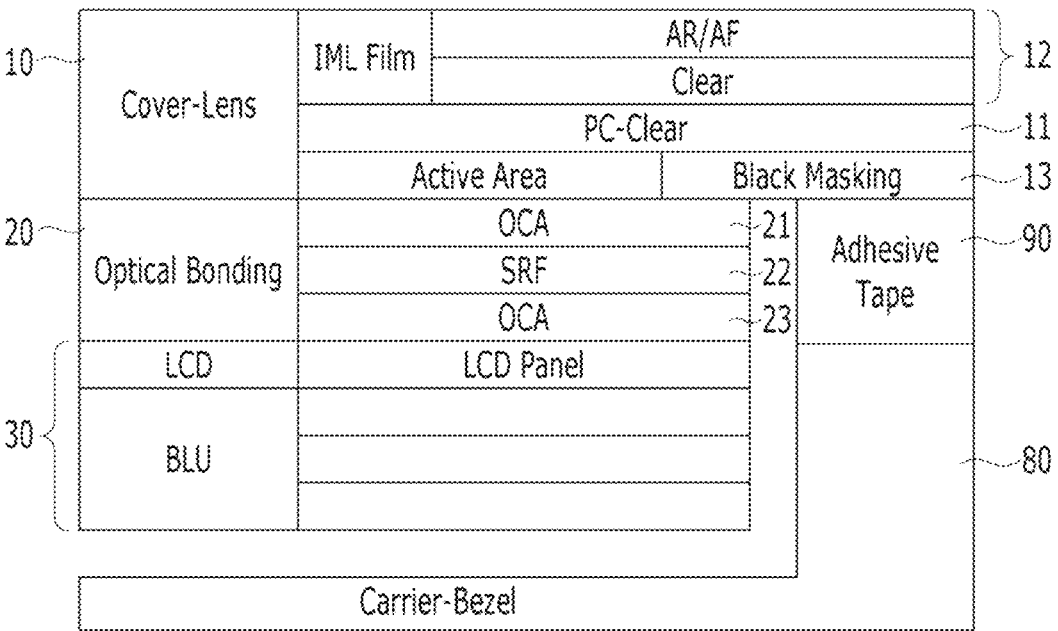
FIG. 2 is a diagram illustrating a cross-sectional configuration of a display for a vehicle including a plastic cover lens according to an embodiment of the present disclosure.

FIG. 2 is a diagram illustrating a cross-sectional configuration of a display for a vehicle including a plastic cover lens according to an embodiment of the present disclosure.

Referring to FIG. 2, the front film 12 including a hard coating layer and a clear layer may be disposed on the front surface of the molded plastic cover lens 10.

Any coating composition capable of improving a surface hardness of the plastic cover lens 10 may be used as the hard coating layer, but it is preferable to use an ultraviolet curable coating composition that does not require high-temperature treatment. The hard coating layer may contain an acrylate-based monomer or an inorganic compound. The hard coating layer serves to improve the surface hardness and at the same time increase chemical resistance of the plastic cover lens 10.

A protective layer may be disposed on the hard coating layer. The protective layer may be a functional coating layer including the anti-fingerprint coating layer (AF), the anti-reflection (AR) coating layer, and the like.

The AR coating layer may be formed to secure light transmittance of the plastic cover lens 10 and reduce reflectance of the plastic cover lens 10 (e.g., to be lower than 1.5%). The AR coating layer may have a structure in which a plurality of media having different densities are stacked. Incident light may be reflected at each interface between two media, superposed each other in different phases, and then cancelled, thereby reducing a final reflected amount of light.

The AF coating layer prevents contamination of a surface of the plastic cover lens 10 based on use of the user, so that visibility is not deteriorated.

The rear film 13 including the black masking layer and an active area corresponding to the liquid crystal display may be disposed on the rear surface of the plastic cover lens 10.

Such plastic cover lens 10 may be formed using the insert mold labeling scheme to include the front film 12 and the rear film 13.

The plastic cover lens 10 according to one embodiment may be formed by printing or pattern-forming the front film 12 and the rear film 13 in advance to partially have a pattern on the front surface of the plastic cover lens 10 molded via the insert mold labeling. For example, an area where the liquid crystal display is disposed may be made transparent so as to have excellent light transmittance, while the remaining area may be treated to be opaque or translucent.

The optical bonding layer 20 disposed on the active area of the rear surface of the plastic cover lens 10 may be composed of the front optically clear adhesive 21 in direct contact with the rear film 12, the super retardation film 22 disposed on a rear surface of the front optically clear adhesive, and the rear optically clear adhesive 23 disposed on a rear surface of the super retardation film 22.

The liquid crystal display module 30 bonded to the plastic cover lens 10 and the optical bonding layer 20 may include the liquid crystal display and the backlight unit. In this regard, an area of a LCD panel may partially overlap an area of the optical bonding layer 20.

In addition, the display for the vehicle may include a carrier-bezel 80 disposed on the rear surface of the black masking layer of the rear surface of the plastic cover lens 10 and mechanically coupled to an edge of the plastic cover lens 10 to firmly maintain the shape of the plastic cover lens 10.

The carrier-bezel 80 may be bonded by disposing an adhesive tape 90 on an area of the plastic cover lens 10 excluding the area where the liquid crystal display is disposed. The adhesive tape 90 may be adhered to at least a portion of the rear surface of the plastic cover lens to couple the plastic cover lens 10 and the carrier-bezel 80 to each other.

For example, in the plastic cover lens 10, the black masking layer is located on a front side compared to that in a glass lens and a gap between the black masking layer and the LCD panel is reduced during operation of the liquid crystal display, thereby reducing a depth of the LCD.

For example, the plastic cover lens 10 needs a gap for assembly in a front surface of the panel-front 40 to prevent exposure of a corner thereof, and a significant increase in processing cost is required to realize such a corner. However, in the plastic cover lens 10, such a shape may be implemented relatively inexpensively.

Figure 3:
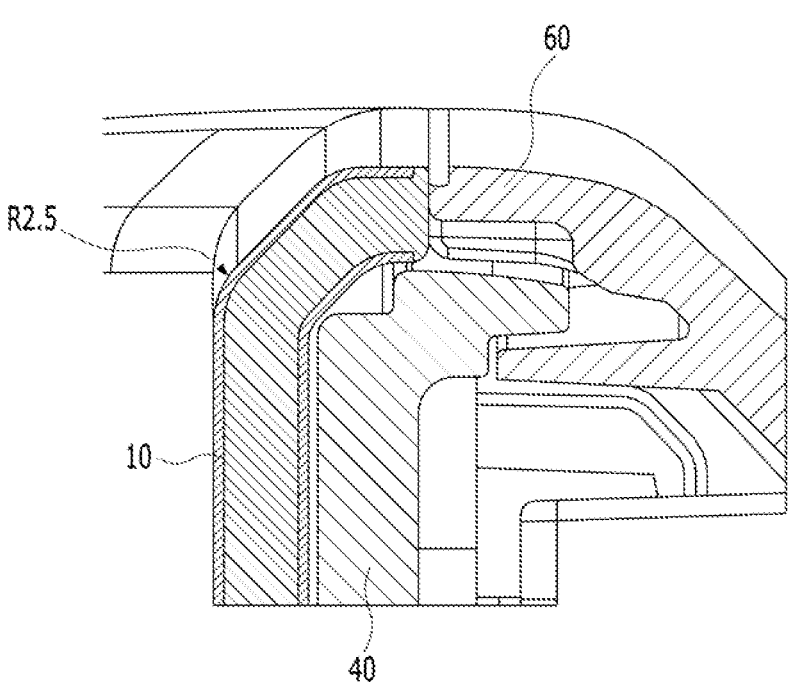
FIG. 3 is a diagram for illustrating coupling of a display including a plastic cover lens having a plurality of curvatures according to one embodiment of the present disclosure.

FIG. 3 is a diagram for illustrating coupling of a display including a plastic cover lens having a plurality of curvatures according to one embodiment of the present disclosure.

Referring to FIG. 3, the corner of the plastic cover lens 10 may be formed to have a curvature. Therefore, the plastic cover lens 10 may be assembled in the display 100 for the vehicle integrally up to the corners thereof without any gaps. Such corners may contribute to preventing the display 100 for the vehicle from being easily damaged by the head-impact applied to the display 100 for the vehicle when the vehicle collides.

The illustrated example shows a case in which the corner of the plastic cover lens 10 has a curvature of R2.5. The curvature may have a value within a range from R2 to R3 when necessary, but may not be necessarily limited to such range. That is, the corner of the plastic cover lens may be rounded with a radius in a range from 2 mm to 3 mm.

In the case of the glass lens, the gap for the assembly is required in the front surface of the panel-front 40 to prevent the exposure of the corner thereof and the significant increase in the processing cost is required to realize such a corner. However, in the plastic cover lens 10, such a shape may be implemented relatively inexpensively.

Figure 4:
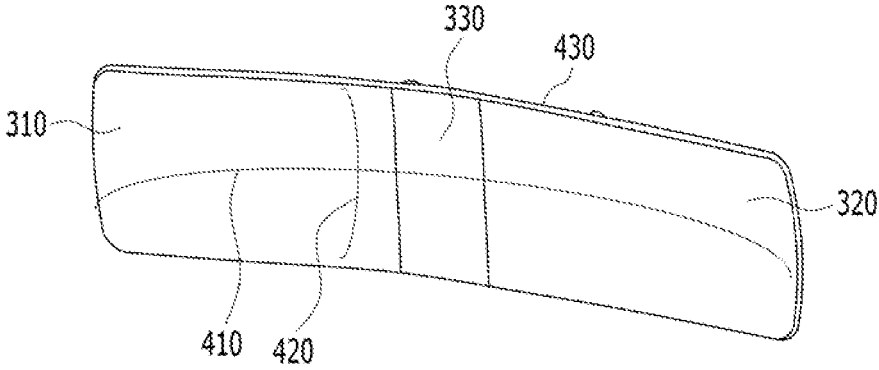
FIG. 4 is a diagram illustrating a plastic cover lens having a plurality of curvatures according to an embodiment of the present disclosure.

FIG. 4 is a diagram illustrating a plastic cover lens having a plurality of curvatures according to an embodiment of the present disclosure.

Referring to FIG. 4, the plastic cover lens 10 having the plurality of curvatures may be disposed on the outermost surface of the display for the vehicle toward the driver.

The display 100 for the vehicle may include a first area located at a left side and a second area located at a right side when viewed by the driver. Because the display 100 for the vehicle is located on a right side when viewed by the driver, the display 100 may have a slightly more curved shape toward the driver. That is, the second area of the plastic cover lens 10 may have the slightly more curved shape toward the driver based on the first area. A bent portion 330 having a relatively small radius of curvature is formed between the first and second areas 310 and 320, so that the second area 220 faces the driver.

Therefore, in the plastic cover lens 10, a first radius of curvature may be applied such that a radius of curvature of the bent portion is greater than a radius of curvature of the first area, and a radius of curvature of the second area is greater than the radius of curvature of the bent portion.

The plastic cover lens 10 may be formed to be gently bent with a first radius of curvature 410 (e.g., R9000 or R12000) in a horizontal direction, and the plastic cover lens 10 may be formed such that a second radius of curvature 420 (e.g., R1800) is also applied in a vertical direction of the plastic cover lens 10 so as to become a concave lens and a third radius of curvature 430 is also applied to the corner of the plastic cover lens 10.

The plastic cover lens 10 may be formed in a shape having a 3D curvature via the plurality of curvatures on the front surface thereof, so that light incident on the front surface of the lens and reflected toward the driver is minimized.

A detailed description of the preferred embodiments of the present disclosure disclosed as described above is provided such that those skilled in the art may implement and practice the present disclosure. Although the description has been made with reference to the preferred embodiments of the present disclosure, those skilled in the art will be able to understand that the present disclosure may be variously modified and changed within a range that does not deviate from the scope of the present disclosure. For example, those skilled in the art may use respective components described in the above-described embodiments in a way of combining them with each other.

Thus, the present disclosure is not intended to be limited to the embodiments illustrated herein but is to be accorded the widest scope consistent with the principles and novel features disclosed herein.

What is claimed is:

1. A display for a vehicle, comprising:
a plastic cover lens including a lens, a front film disposed on a front surface of the lens, and a rear film disposed on a rear surface of the lens;
a liquid crystal display (LCD) module disposed at a rear of the plastic cover lens;
an optical bonding layer disposed between the plastic cover lens and the LCD module, the optical bonding layer comprising a super retardation film (SRF) and an optically clear adhesive (OCA) disposed between and in direct contact with the rear film and the SRF;
a panel-front disposed at a rear of the plastic cover lens, in contact with and supporting the LCD module, and configured to prevent deformation of the plastic cover lens; and
a rear cover disposed at a rear of the panel-front,
wherein the rear film of the plastic cover lens includes a black masking layer printed on the rear surface of the lens excluding an active area corresponding to a position of the LCD module, and
wherein the OCA is in direct contact with a portion of the black masking layer adjoining the active area.

2. The display of claim 1, wherein the front film includes an anti-reflection (AR) coating layer and an anti-fingerprint (AF) coating layer formed at a front surface of the plastic cover lens via vacuum deposition.

3. The display of claim 1, wherein the plastic cover lens includes the front film and the rear film pre-molded in a shape of the plastic cover lens and is formed via insert mold labeling (IML).

4. The display of claim 3, wherein the plastic cover lens is formed such that a residual stress resulted from injection is minimized as the front film is disposed in an upper core of a mold and the rear film is disposed in a lower core of the mold and are pressurized to simultaneously perform injection-compression molding (ICM) during in-mold molding.

5. The display of claim 1, wherein the plastic cover lens includes a first area disposed on a side of a driver, a second area disposed on an opposite side of the first area, and a bent portion disposed between the first area and the second area.

6. The display of claim 5, wherein a first radius of curvature of the plastic cover lens is applied such that a radius of curvature of the bent portion is greater than a radius of curvature of the first area and a radius of curvature of the second area is greater than the radius of curvature of the bent portion.

7. The display of claim 6, wherein the plastic cover lens is formed in a shape having a 3D curvature as the first radius of curvature is applied to the plastic cover lens in a horizontal direction, a second radius of curvature is applied to the plastic cover lens in a vertical direction for the plastic cover lens to become a concave lens, and a third radius of curvature is applied to a corner of the plastic cover lens.

8. The display of claim 7, wherein the corner of the plastic cover lens is formed to be rounded with a radius in a range from 2 mm to 3 mm.

9. The display of claim 1, further comprising a carrier-bezel mechanically coupled to an edge of the plastic cover lens to firmly maintain a shape of the plastic cover lens.

10. The display of claim 9, further comprising an adhesive tape adhered to at least a portion of the rear surface of the plastic cover lens to couple the plastic cover lens and the carrier-bezel to each other.

* * * * *